United States Patent [19]
Pollington

[11] Patent Number: 4,776,241
[45] Date of Patent: Oct. 11, 1988

[54] CUTTING TOOL

[76] Inventor: Bernard Pollington, 110 6th St., Marion, Mich. 49665

[21] Appl. No.: 579,411

[22] Filed: Feb. 13, 1984

[51] Int. Cl.⁴ .............................................. B23B 51/00
[52] U.S. Cl. .................. 76/108 R; 175/410; 408/144; 408/227
[58] Field of Search ............... 408/144, 227, 228, 188, 408/223, 224, 225, 230; 175/401, 410, 411; 76/101 A, 108 R, 108 A; 407/54

[56] References Cited

U.S. PATENT DOCUMENTS

| | | | |
|---|---|---|---|
| 1,799,318 | 4/1931 | Rekback | 175/411 X |
| 1,902,513 | 3/1933 | Meutsch | 76/101 A |
| 2,372,612 | 3/1945 | Stogsdill | 76/108 R |
| 2,626,533 | 1/1953 | Huckshold | 76/108 R |
| 2,740,611 | 4/1956 | Bowen | 175/410 |
| 3,158,922 | 12/1962 | Reese | 29/105 |

FOREIGN PATENT DOCUMENTS

| | | | |
|---|---|---|---|
| 951335 | 10/1949 | France | 175/410 |
| 612147 | 3/1935 | Fed. Rep. of Germany | 175/410 |
| 1911188 | 2/1972 | Fed. Rep. of Germany | 175/410 |
| 562649 | 6/1977 | U.S.S.R. | 175/410 |
| 351337 | 6/1931 | United Kingdom | 175/410 |
| 672039 | 5/1952 | United Kingdom | 76/101 A |

Primary Examiner—Z. R. Bilinsky
Attorney, Agent, or Firm—Gifford, Groh, VanOphem, Sheridan, Sprinkle and Dolgorukov

[57] ABSTRACT

A cutting tool comprising a shank having a substantially diametrical cut through one end of the shank and having the diametrically opposed limbs formed by such a cut bent radially outwardly from the axis of the shank. Cutting blades are secured to the flat surfaces of the limbs formed by the cut. Preferably, the limbs are bent outwardly in opposite directions along the plane of the cut, and the edges of overlapping portions of the limbs are welded together to strengthen the cutting tool.

8 Claims, 1 Drawing Sheet

CUTTING TOOL

BACKGROUND OF THE INVENTION

1. Field of the Present Invention

The present invention relates generally to cutting tools, and more particularly to cutting tools adapted to be received in a chuck for rotation therewith to rotatably drive cutting blades mounted on the end of the tool.

2. Description of the Prior Art

There are many previously known rotary cutting tools having a shank which is adapted to be received in a chuck of a rotary drill. Although the shank portion of the tool is relatively easy to produce, the blade supporting head of the tool requires substantial, additional manufacturing operations in order to provide a sturdy, durable tool. For example, it may be necessary to machine the end of the shank in order to provide a sufficient mating surface for the support and secure attachment of the cutting blades.

Moreover, when the size of the hole to be drilled or chamfered by the cutting tool is substantially larger than the diameter of the shank, material must be added to the blade supporting end of the shank in order to properly position the blades. Such addition of material not only increases the cost and the weight of the tool, but can also require that substantial shaping or interfacing of parts be performed in order to construct a sturdy, durable tool.

On the other hand, the tool may be cast in a mold having a particular shape which can then be machined into final shape and then provided with the cutting blades. However, each different size of cutting tool requires a different mold and thus substantially increases the cost of producing a set of differently sized cutting tools. Moreover, since cutting blades are often disposed on diametrically opposed sides of the cutting tool, a separate machining operation must be performed on each side of the tool to provide appropriate lands for the cutting blades.

SUMMARY OF THE PRESENT INVENTION

The present invention overcomes the above-mentioned disadvantages by providing a tool, and a method for making the tool, in which the blade supporting portions of the tool are formed by portions of the cylindrical shank. In particular, an end of the shank is split so as to form substantially diametrically opposed limbs which are then bent radially outwardly from the axis of the shank to any desired degree. The cutting or splitting of the shank simultaneously forms flat blade engaging surfaces to which the hardened cutting blades can be secured. The ends of the limbs can be cut or machined to any shape desired so as to support the cutting blades in a desired alignment. The cutting blades, preferably hardened metal blades, can be secured to the limbs in any conventional manner such as brazing or gluing In the preferred embodiment of the present invention, the limbs are bent in opposite directions along the plane of the cut which has been made in the end of the shank. In such a tool, portions of the limb will overlap each other, and once the limbs have been bent to the desired degree, the edges of the overlapping portions of the limbs can be welded together to strengthen the tool and fixedly position the ends of the limbs.

Thus, the present invention provides a rotary cutting tool adapted to support cutting blades in a desired position which is substantially easier to make and substantially less costly than previously known blade supporting cutting tools. The method for making the tool, and the tool itself, employs substantially less material than previously known cutting tools without sacrificing rigidity or strength in the cutting tool. Moreover, manufacturing of the tool is simplified, especially since the degree to which the limbs are spread governs the size of the hole to be cut or chamfered by the cutting tool without complex and time consuming operations on the end of the tool shank.

BRIEF DESCRIPTION OF THE DRAWING

The present invention will be more clearly understood by reference of the following detailed description of a preferred embodiment of the present invention, when read in conjunction with the accompanying drawing in which like reference characters refer to like parts throughout the several views and in which.

DETAILED DESCRIPTION OF THE PREFERRED EMBODIMENT OF THE PRESENT INVENTION

Figure 1:
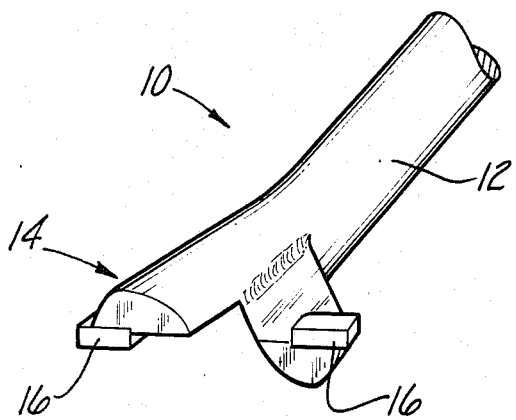
FIG. 1 is a perspective view of the cutting tool according to the present invention.

Referring first to FIG. 1, the cutting tool 10 according to the present invention is thereshown comprising an elongated, solid cylindrical shank 12. One end, the head 14, is adapted to support hardened cutting blades 16 in a position radially spaced from the axis of the cylindrical shank 12. The other end of the shank 12 is adapted to be received in a drill chuck in a well known manner.

Figure 2:
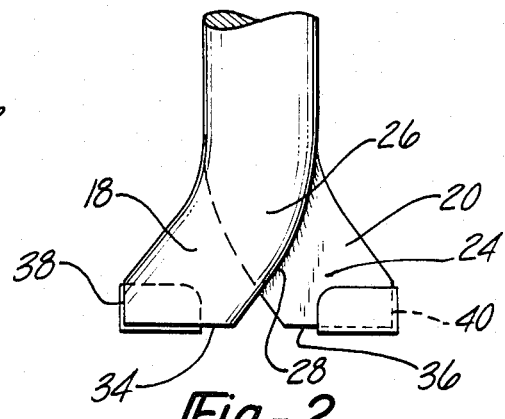
FIG. 2 is an elevational view of the tool shown in FIG. 1.
Figure 3:
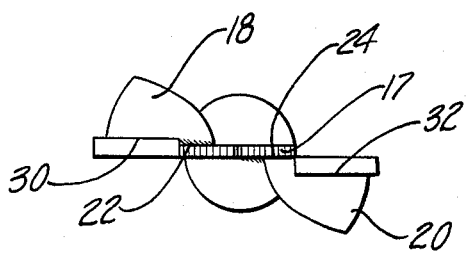
FIG. 3 is a bottom plan view of the tool shown in FIGS. 1 and 2.

As best shown in FIGS. 2 and 3, a diametrical cut 17 (FIG. 3) extends axially along an end portion of the shank 12 to form substantially diametrically opposed limbs 18 and 20. The limbs 8 and 20 are then bent radially outwardly as shown in FIG. 2 to provide the enlarged head portion 14 of the cutting tool 10. Of course, the end of the shank 12 can be heated while the limbs 18 and 20 are bent outwardly.

In addition, the ends of the limbs 18 and 20 can be machined, preferably by cutting, so that the tips of the limbs 18 and 20 are appropriately configured for the particular cutting job desired. In any event, it will be seen that the cut 17 at the end of the shank 12 provides flat surfaces 22 and 24 on the limbs 18 and 20 respectively, which provide mating surfaces for secure attachment of the cutting blades 16 to the tips of the limbs 18 and 20.

As best shown in FIG. 3, the limbs 18 and 20 are radially bent along the plane of the cut 17 in the end of the shank 12 thus, portions of the limbs 18 and 20 overlap in an area designated at 26 in FIG. 2. The edges of the limbs 18 and 20 adjacent the overlapping area 26 can be secured together by the welds 28 to stengthen and rigidly support the ends of the limbs 18 and 20. As also shown in FIG. 3, the flat surfaces 22 and 24 of the limbs 18 and 20 can be notched at the tips of the limbs 18 and 20 to form recesses 30 and 32, respectively, adapted to receive the cutting blades 16 therein. The recesses 30 and 32 provide additional support for the cutting blades 16 secured to the head 14 of the cutting tool 10. Of course, the cutting blades 16 can be secured in the recesses 30 and 32 by brazing or gluing.

Referring again to FIG. 2, it can be seen that the tips of the limbs 18 and 20 have been machined to provide radially extending surfaces 34 and 36, respectively, which are substantially perpendicular to the axis of the shank 12. In addition, the limbs 18 and 20 have also been cut to provide axially extending surfaces 38 and 40 on the outermost ends of the tips of the limbs 18 and 20. Correspondingly shaped edges on the blade 16 extend slightly beyond the surfaces 34 and 38 of the limb 18 and 36 and 40 of limb 20, whereby cutting blades 16 are exposed for cutting surfaces of a workpiece parallel and perpendicular to the axis of the shank 12.

Figure 4:
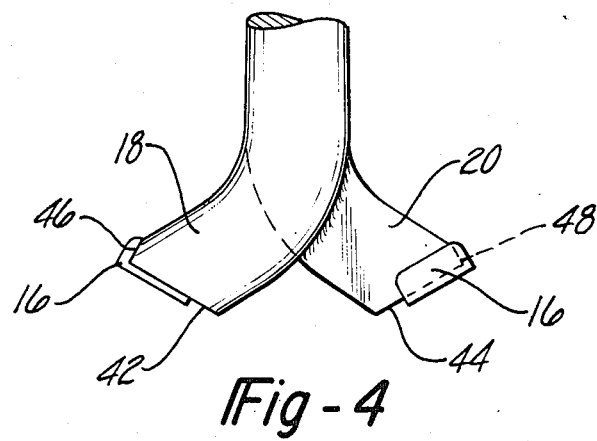
FIG. 4 is an elevational view similar to FIG. 2 showing the modification of the tool according to the present invention.

Referring now to FIG. 4, the tips of limbs 18 and 20 are cut at a reverse angle which provides tip surfaces 42 and 44 which form an acute angle with respect to a line perpendicular to the axis of the shank 12. In addition, the outermost sides of the tip are cut to provide surfaces 46 and 48 inclined in an acute angle with respect to the axis of the shank 12. Preferably, surfaces 42, 44 are perpendicular to surfaces 46, 48 so as to provide a chamfering tool which is operable during upward as well as downward movement of the tool 10 along the axis of the shank 12. Nevertheless, a rectangular cutting blade 16, as used in the embodiment shown in FIG. 2, can be secured to extend over the edges 42 and 46 of the limb 18 as well as edges 44 and 48 of the limb 20.

Figure 5:
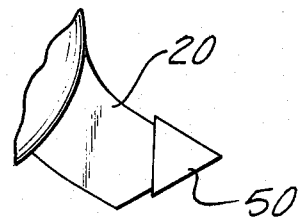
FIG. 5 is a fragmentary, elevational view similar to FIGS. 2 and 4 but showing a further modification of the tool according to the present invention.

Referring now to FIG. 5, the limb 20 of a cutting tool 10 is thereshown adapted to support the triangular cutting blade 50. In such a tool 10, a notch for receiving the blade 50 can be formed by merely making an axial cut across the tip of the limb 20 and thus avoids the need for forming a sharply angled recess as would be necessary with the embodiment shown in FIGS. 2 and 4. Nevertheless, the formation of the cutting tool 10 as shown in the embodiment of FIG. 5, in which limb 18 would also be configured similarly to the configuration of the limb 20, further simplifies the manner in which cutting blades 16 can be securely, rigidly supported on the tip of the limbs 18 and 20.

Figure 6:
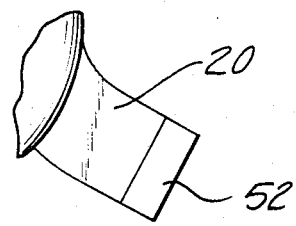
FIG. 6 is a fragmentary, elevational view similar to FIG. 5 but showing a further modification of the FIG. 5 but showing a further modification of the cutting tool according to the present invention.

FIG. 6 shown an embodiment of the tool 10 wherein a tip of the limb 20 is provided with a cutting blade 52 extending across the entire tip of the limb 20. Similarly, the limb 18 (not shown) would be configured in substantially the same manner. Unlike the embodiment shown in FIG. 2, the embodiment of FIG. 6 permits a substantially rectangular cutting blade, such as the blade 16, to utilize three exposed surfaces which can be used for cutting operations. Moreover, unlike the embodiments disclosed in FIGS. 2 and 4, such a construction avoids the need for cutting a sharply angled notch at the tip of limbs 18 and 20, and thus further serves to simplify the production of the cutting tool 10.

As a result, the present invention provides a cutting tool which is simple to make, and which avoids the need for additional materials or stamping operations previously required to expand the head of the cutting tool so that the cutting blades are positioned radially outwardly from the shank of the cutting tool. Nevertheless, the tool remains strong and retains its shape under operating conditions. Moreover, the separation of the cutting blades, and, thus, the diameter of the hole to be bored or chamfered by the cutting tool, can be varied by merely changing the depth of the cut made in the end of the shank and the degree to which the limbs resulting from the cut are bent outwardly from the axis of the shank. Nevertheless, the welds at the edges of the overlapping portions of the limbs strengthen the cutting tool. Moreover, the tips of the limbs can be cut to any desired shape in order to adjust the angle of the chamfer to be cut by a tool made in accordance with the present invention. Moreover, it will be understood that the tool can be adapted for use with various shapes of cutting blades, and can be adapted to expose one or more cutting surfaces of the blades.

Having thus described my invention, many modifications thereto will become apparent to those skilled in the art to which it pertains without departing from the scope and spirit of the present invention and defined in the appended claims.

What is claimed is:

1. A drill bit for rotation by a chuck comprising:
a cylindrical shaft extending along longitudinal axis, and having a predetermined diameter dimensioned for insertion of a first end of said cylindrical shaft in said chuck, said cylindrical shaft having a second end portion forming a pair of limbs and a diametrical cut formed therebetween, each of said pair of limbs being bent radially outwardly from said longitudinal axis of said shaft in opposite directions along said diametrical cut, each of said pair of limbs having curved portion and an outermost tip, said curved portion having a substantially semi-circular surface and a flat surface extending along said diametrical cut, said curved portion having a substantially uniform cross-section, said pair of limbs being welded together where said semi-circular surface of one of said pair of limbs crosses said flat surface of another of said pair of limbs along said diametrical cut to strength and rigidly support said pair of limbs; and
a cutting blade secured to said outermost tip of each of said pair of limbs.

2. The invention as defined in claim 1 wherein said pair of limbs bend in opposite directions along a plane of said diametrical cut.

3. The invention as defined in claim 1 wherein said cutting blade has at least one cutting edge projecting outwardly from said outermost tip each of said pair of limbs.

4. The invention as defined in claim 3 wherein said at least one cutting edge extends axially beyond each of said pair of limbs.

5. The invention as defined in claim 3 wherein said at least one cutting edge extends radially outwardly from each of said pair of limbs.

6. The invention as defined in claim 3 wherein said at least one cutting edge is inclined at an acute angle with respect to said longitudinal axis of said shaft.

7. The invention as defined in claim 3 wherein said at least one edge is inclined at an obtuse angle with respect to said longitudinal axis of said shaft.

8. A method for forming a drill bit for use with a conventional chuck of a drill comprising;

forming a cylindrical shaft having a predetermined diameter dimensioned for insertion of a first end of said cylindrical shaft into said chuck;

splitting a second end portion of said cylindrical shaft by axially cutting said shaft substantially along said predetermined diameter of said shaft to form first and second limbs and form a substantially flat surface on each of said first and second limbs along a plane of a diametrical cut, bending said first and second limbs radially outwardly from the axis of said cylindrical shaft in opposite directions along said diametrical cut, and forming an overlapping portion of said flat surface of each of said first and second limbs along said diametrical cut, securing a cutting blade to said flat surface of each of said first and second limbs, and welding said overlapping portion of said first and second limbs together along said diametrical cut to strengthen and rigidly support said first and second limbs.

* * * * *

UNITED STATES PATENT AND TRADEMARK OFFICE
CERTIFICATE OF CORRECTION

PATENT NO. : 4,776,241
DATED : 10/11/88
INVENTOR(S) : Bernard Pollington

It is certified that error appears in the above-identified patent and that said Letters Patent is hereby corrected as shown below:

```
Col. 2, line 15, delete "of" and insert --to--;
        line 34, delete the complete line;
        line 51, delete "8" and insert --18--;
Col. 3, line 51, delete "shown" and insert --shows--;
Col. 4, line 44, delete "strength" and insert
   --strengthen--;
```

Signed and Sealed this

Twentieth Day of June, 1989

Attest:

DONALD J. QUIGG

Attesting Officer

Commissioner of Patents and Trademarks